MAGNETIC RECORDING ATTACHMENT
Original Filed Nov. 23, 1956 3 Sheets-Sheet 1
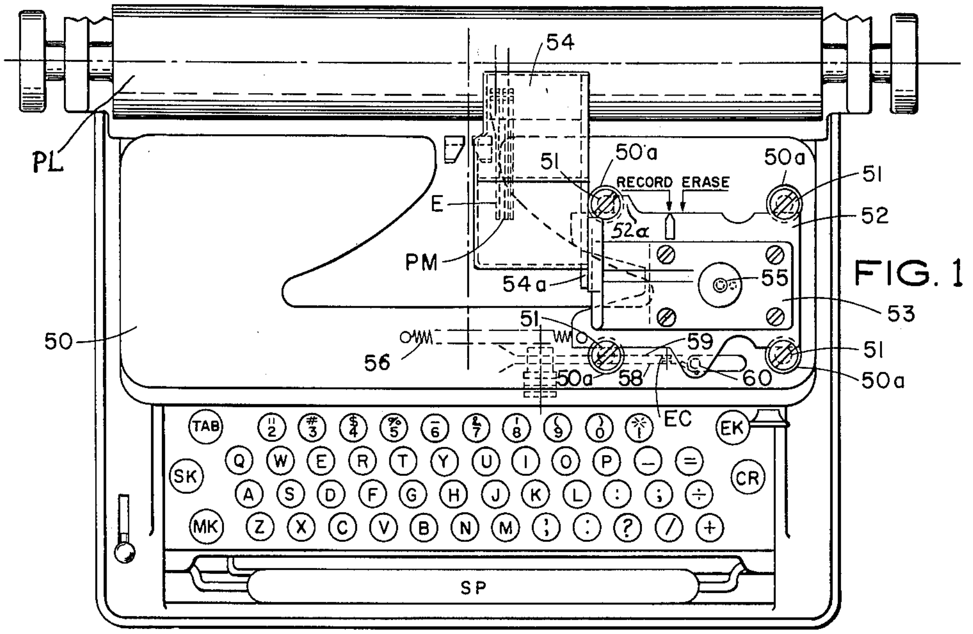
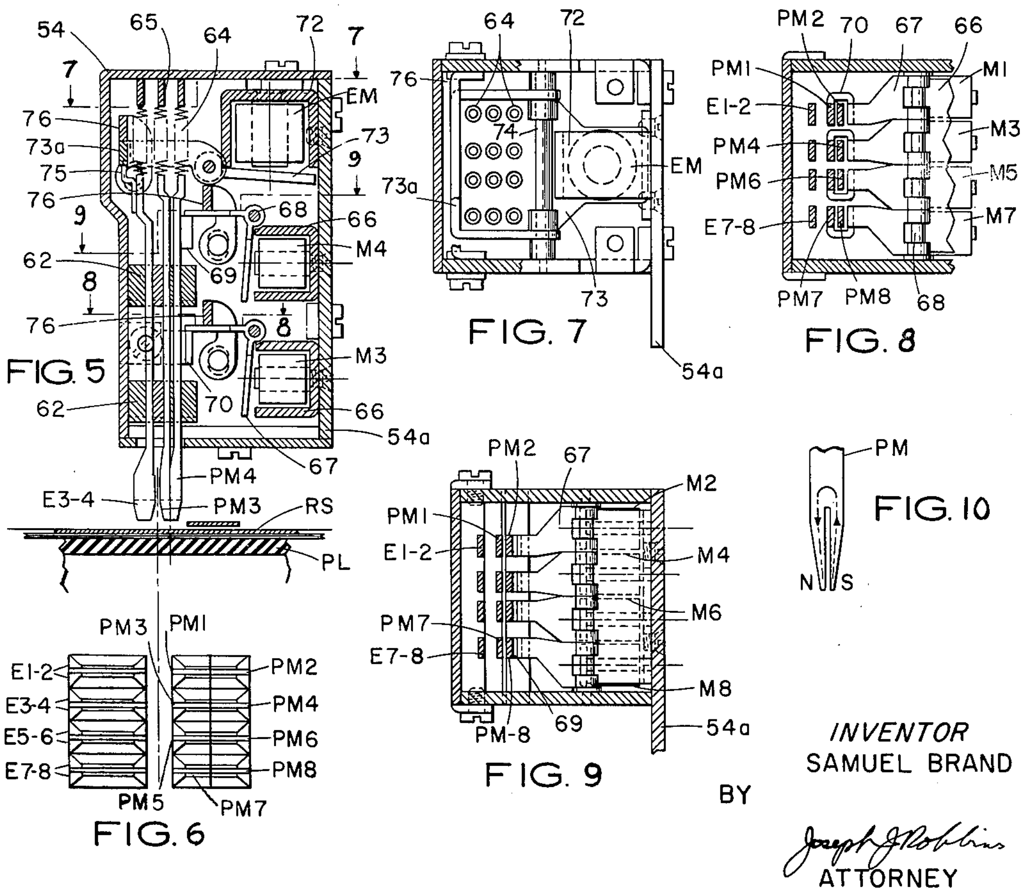
FIG. 5, FIG. 6, FIG. 7, FIG. 8, FIG. 9, FIG. 10
INVENTOR
SAMUEL BRAND
BY
Joseph J. Robbins
ATTORNEY

MAGNETIC RECORDING ATTACHMENT

Original Filed Nov. 23, 1956

INVENTOR
SAMUEL BRAND
BY
Joseph J. Robbins
ATTORNEY

INVENTOR
SAMUEL BRAND

BY Joseph J. Robbins
ATTORNEY 3,245,064
Patented Apr. 5, 1966

3,245,064
MAGNETIC RECORDING ATTACHMENT

Samuel Brand, 48 Crary Ave., Binghamton, N.Y.

Original application Nov. 23, 1956, Ser. No. 624,152, now Patent No. 3,045,218, dated July 17, 1962. Divided and this application June 12, 1962, Ser. No. 201,891
10 Claims. (Cl. 340—174.1)

This case is a division of my application Serial No. 624,152, filed November 23, 1956, now patent No. 3,045,218 and relates to magnetic character recording means, particularly in association with character printing means.

An object of the present invention is to provide a magnetic recording unit attachable to a character or item printing or typing machine and characterized by a set of individually movable permanent magnets drivable selectively in character coding combinations into magnetic recording impact with a record medium carried by the platen of the printing machine. Magnetic recording may be effected concurrently with printing under control of common character selecting means. The set of permanent recording magnets is vertically offset from the printing position of the machine and is sized to record a character magnetically within an item field of the same size, at least in width, as a printed character space, whereby a line of magnetic character representations will be parallel to and of the same length as a line of the concurrently typed characters. A feature of the invention is that the magnetic recording unit is attachable to the exterior of the printing or typing machine, no alteration or addition to the framework of the machine being required, but suitable provision being made for mounting of the attachment to an outside part of the machine, preferably to the top plate or cover of the machine housing.

Another feature of the invention involves provision for enabling carbon copies of the printed matter to be made without receiving carbon impressions of the impacts of the permanent magnets with the top sheet, shielding being provided between the top sheet and the underlying sheets at the magnetic recording position.

Another object of the invention is to provide the magnetic recording attachment with a set of permanent erase magnets of the same overall size as the set of permanent recording magnets but of opposite polarity, the set of permanent recording magnets and the set of permanent erase magnets to be alternatively settable at magnetic recording or impacting position depending on whether a character is to be magnetically recorded in an item field or a previously recorded magnetic character representation is to be magnetically erased from the item field.

Other objects of the invention reside in any other novel feature or combination of features disclosed in the detailed description, the claims, and the drawings, wherein:

FIG. 1 is a general plan view of an embodiment of the invention, involving a magnetic recording and erasing unit as an attachment to a typewriter.

FIG. 5 is a section along line 5—5 of FIG. 3.

FIG. 6 is a bottom view of the permanent recording and erasing heads or impact ends, on a magnified scale.

FIGS. 7, 8 and 9 are sections, respectively, along lines 7—7, 8—8 and 9—9 of FIG. 5.

FIG. 10 is a fragmentary side view of the head of a permanent recording magnet in the attachment.

Figure 11:
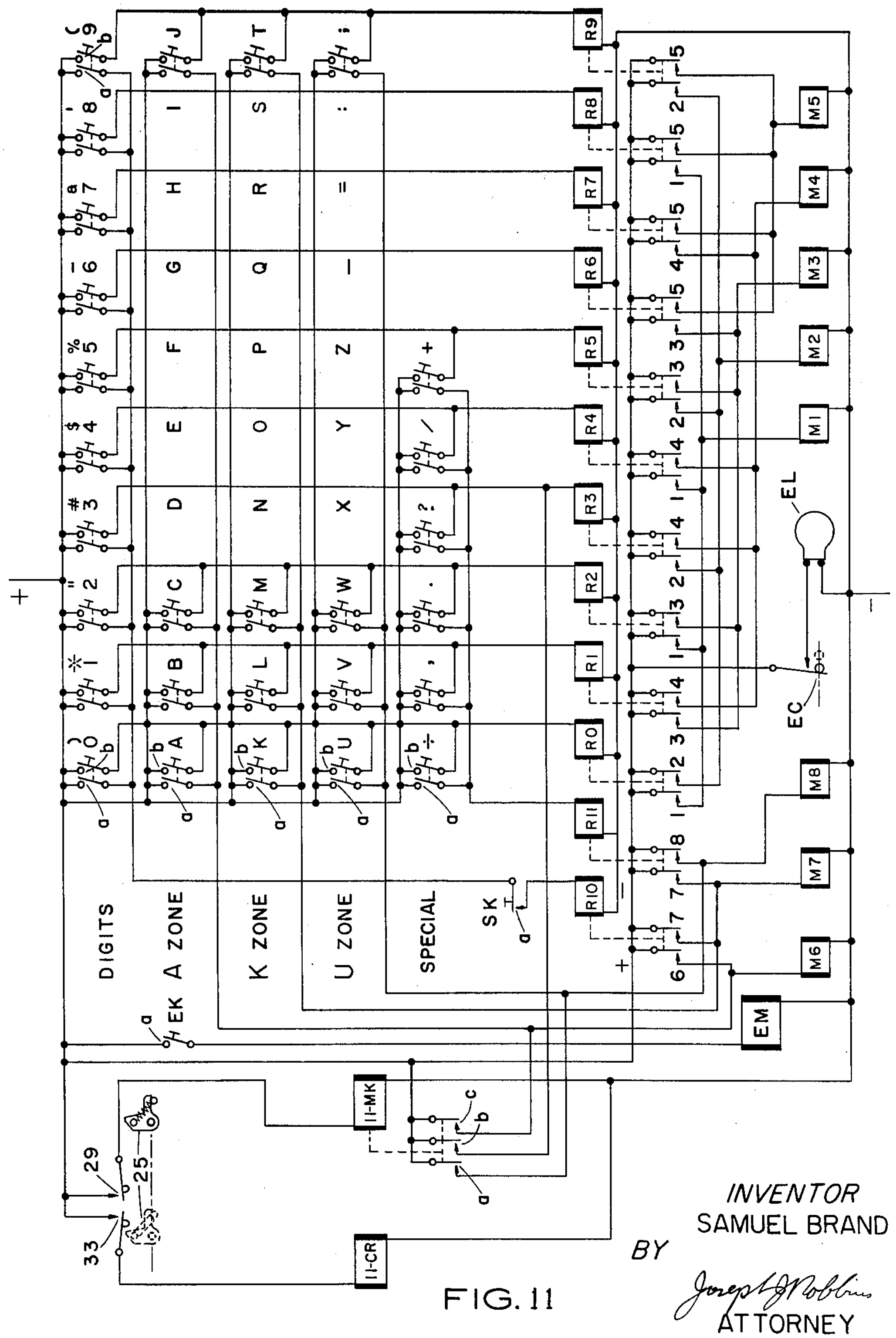

FIG. 11 shows the circuit diagram of the embodiment.

In the disclosed embodiment, a set of permanent recording magnets, a set of permanent erase magnets, and associated electromagnets are all incorporated in a magnetic recording unit attachable to a printing machine such as a typewriter or the like. Any standard typewriter fitted with a special housing part for mounting the attachable unit may be used. Key contacts will be associated in known manner with the typewriter keyboard. Operation of keys to type items on a magnetic record carried by the platen will close key contacts to establish circuits in an item encoding network to energize the electromagnets for actuating the permanent recording magnets in various character groupings so as to impress the record with magnetic signal patterns encoding the typed items.

The typewriter in FIG. 1 may be assumed to be of the kind disclosed in Patents 1,777,055 and 1,873,512. The key contacts, shown diagrammatically in FIG. 11, may be associated with the keys in the manner indicated for example in FIG. 9 of Patent 2,403,005.

Figures 2, 3, 4:
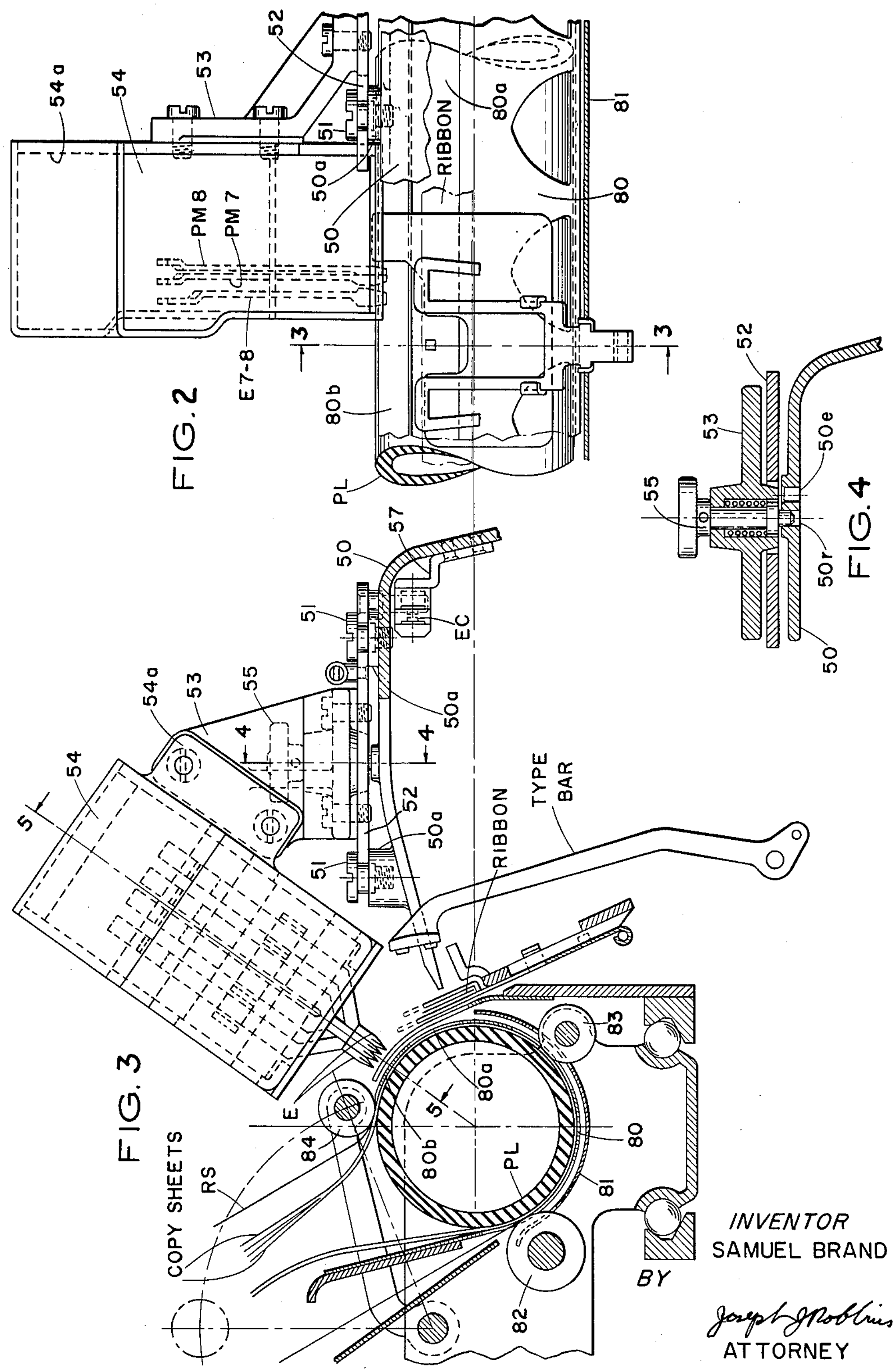
FIG. 2 is a front elevation of a central portion of the FIG. 1 apparatus on a larger scale, parts being broken away and sectioned to aid the disclosure.
FIG. 3 is a section, essentially along line 3—3 of FIG. 2.
FIG. 4 is a section along line 4—4 of FIG. 3.

A special type bar cover is substituted for the regular cover. This special cover 50 is formed with four posts **50*a* at the corners of a rectangle. Threaded into these posts are screw studs 51. The base plate 52 if the magnetic recording unit is confined between the heads of the studs and the top surfaces of the posts, with smooth shank portions of the studs engaging parallel front and rear edges of base plate 52 to guide the base plate for adjustment, parallel to platen PL, between "record" and "erase" positions. Fixed on the base plate 52 is a right angle bracket 53, a housing 54 for the permanent magnets having its right side wall 54*a* fastened to the vertical leg of the bracket. The bracket thereby supports the housing 54 completely from its right side in a position clear above and inclined toward the front of typewriter platen PL, as seen in FIG. 3. Mounted in the bracket 53 above the cover 50 is a spring-depressed latch pin 55 which reaches down through an opening in base plate 52 into engagement with a hole 50*r* or 50*e* in the cover. With the latch pin seated in 50*r*, it is locking the magnetic recording unit in record position. To adjust the recording unit to erase position, the operator grasps the head of the latch pin to lift it from hole 50*r* and then slides the unit to the right until the latch pin springs into the hole 50*e* (FIG. 4). This locks the recording unit in erase position. Should the operator release the recording unit between its two positions, it will be returned to record position by a spring 56 between cover 50 and base plate 52. Movement of the recording unit to the left beyond its record position is prevented by contact of a rearward projection 52*a* of the base plate with the rear, left screw stud 51. Directly under cover 50 and attached to it, through insulation, by a bracket 57 are contact blades 58 and 59 provided with coacting contacts EC. A pin 60 extending down from base plate 52 engages the inclined insulating end of blade 58 to hold contacts EC open while the recording unit is in recording position. When the recording unit is adjusted to erase position, pin 60** permits contacts EC to close, completing a circuit through a lamp EL (FIG. 11) which will be in sight of the operator to signal the fact that the recording unit is in erase position.

An eight-position combinational code of character representation is chosen. An item field for receiving any selected character coding pattern is visualized as having eight index positions arranged in two contiguous columns, four index positions per column. To record items in the chosen code, there is a set of eight permanent magnets PM1 to PM8 (see particularly FIGS. 5 and 6) made of Alnico or other material having a high magnetic permanence. These magnets are constructed as elongated pins, each terminating at its lower, record impacting end in a bipolar recording head strongly magnetized with the polarity indicated in FIG. 10 for producing an operative magnetic signal in an index position of the magnetic record RS on the platen PL. The shanks of the magnets are oblong in cross section and pass through guide holes of conforming cross sectional shape in upper and lower blocks 62 mounted to the left side wall of the housing 54, whereby the magnets are slidably guided for lengthwise movement toward platen PL. The heads of magnets PM are arranged in two columns, each with four heads, corresponding to the arrangement of index positions in an item field of the record. The eight recording heads are closely bunched in flat sided engagement with one another, so as to occupy a minimum area such as to provide for recording in an item field of small size commensurate with the size of a typed character space.

To the left of magnets PM is a single column of four permanent erase magnets E, each in the form of an elongated pin of oblong cross section, guided similarly to the recording magnets PM for lengthwise slidable movement in the blocks 62. The erase magnets are of material similar to the recording magnets and terminate at their lower ends in bipolar erasing heads, each magnetized with a polarity reverse to that of the recording heads. Each erase head is twice as wide as a recording head. At erase setting of the unit, the erase heads E1–2, E3–4, E5–6 and E7–8 respectively cover the same index positions of an item field in magnetic recording location as are covered at the record setting of the unit by the four pairs of recording heads PM1–PM2, PM3–PM4, PM5–PM6 and PM7–PM8. All four erase heads will be simultaneously impacted with an item field to erase any operative magnetic signals therefrom.

Individual springs 64 between the permanent magnets, PM and E, and bars 65, depending from the top wall of the housing 54, normally maintain the permanent magnets elevated.

Actuation of recording magnets PM1 to PM8 is effected on energization of respectively associated electromagnets M1 to M8. The electromagnets are in two tiers, each within a yoke 66, the electromagnets and yokes being secured inside housing 54 to its right side wall **54*a*. The armatures of the electromagnets are parts of bell crank levers 67 pivoted on rods 68. Levers 67 in the upper row are associated with electromagnets M2, 4, 6 and 8 and rest on lugs 69 of the permanent recording magnets PM2, 4, 6 and 8 (see FIGS. 5 and 9). Levers 67 in the lower row rest on the front of looped lugs 70 extending from permanent magnets PM1, 3, 5 and 7 and detouring around and to the front of PM2, 4, 6 and 8. On energization of an electromagnet M1 to M8, its armature lever 67 depresses the associated permanent recording magnet, against the force of a spring 64**, to impact its recording head with an index position of an item field of the magnetic record on the platen to impress an operative magnetic signal in the index position.

The four erase magnets E are under common control of a single large electromagnet EM mounted inside a yoke 72 which is fastened, above electromagnets M, to the side wall **54*a* of housing 54 (see FIGS. 5 and 7). Armature lever 73 of EM is pivoted on a fixed rod 74 and provided with a bail bar 73*a* resting on angle pieces 75 fixed to the erase magnets. On energization of electromagnet EM, all four permanent magnets E are depressed in unison by the bail bar 73*a*** into impact with all the index positions of an item field at magnetic recording location.

Adjustable bail bars 76 are located above the armature levers of the electromagnets M and EM to determine the retracted positions of the armature levers and to serve thereby to regulate the force of impact of the permanent magnet heads with the data record.

As may be understood from FIG. 1, with the magnetic recording unit mounted on the typewriter, the operator's view of the typing is little obstructed. The item field at the magnetic recording station is located about ½ inch above and to the right of the printing position (see FIGS. 2 and 3). When the magnetic recording unit is in record setting, the two columns of magnets PM are at magnetic recording station, facing the item field at this station and ready to impress this item field with the encoding magnetic signal pattern of the item to be printed in the character space at printing position. As a line of items is typed on the data record, a line of related item coding patterns is recorded by magnets PM in a parallel line of item fields successively stepped to magnetic recording station, such row or line of item fields constituting a record field.

It may be desired to duplicate the typed matter on the magnetic record upon the usual carbon copy sheets. In the present case, this must be done without allowing the impacts of permanent magnets PM and E to produce carbon impressions on the copy sheets. For this purpose, instead of being equipped with the usual paper guide around the platen, the typewriter is equipped with two paper guides, an inner guide 80 and an outer guide 81 (see FIGS. 2 and 3). The inner guide is formed with a long horizontal slot **80*a* extending along the printing line. Above the slot, the inner guide is left with a long horizontal strip 80*b* opposite the permanent magnets and integrally joined at its two ends, outside typing range, with the main portion of the inner guide below the slot. The carbon copy sheets, with their overlying carbon papers, will be inserted from the rear of the platen PL into the space between the platen and the inner guide 80. At the same time, the top sheet—magnetic data record sheet RS—will be inserted also from the rear of the platen into the space between the inner and outer guides 80 and 81. The data record RS and the copy sheets will be fed around the platen together by the rear feed rolls 82 and the front tension rolls 83 and emerge, as shown in FIG. 3, above the platen and kept in place by the platen bail pressure rolls 84. The copy sheets will have been passed under the guard strip 80*b* while the data record RS will have been fed over the guard strip. On entering new sheets around the platen, the top edges of the copy sheets and carbon papers may tend to enter slot 80*a* and fail to get under guard strip 80*b*. The guard strip, however, being light and flexible, can be easily lifted by the operator and the top edges of the carbon papers and copy sheets tucked under the strip to be fed into place under pressure rolls 84. The slot 80*a* exposes the copy sheets to the blows of the types so that the typing of items on top sheet RS produces carbon impressions on the copy sheets. On the other hand, the guard strip 80*b*** covering the copy sheets takes the force of impacts from the permanent magnets when striking the magnetic data record RS and prevents these impacts from producing transfer impressions upon the copy sheets.

The apparatus in FIGS. 1 to 10 will be explained further with particular reference to the circuit diagram, FIG. 11. Each item key of the keyboard of the typewriter, when depressed to type an item, closes a pair of key contacts *a* and *b*. The *b* contacts of the several digit keys respectively connect to relays R0 to R9. Each relay, upon energization, closes a pair of relay contacts leading to a pair of the electromagnets M1 to M5 identified by the reference numbers of the relay contacts. For instance, operation of key 9 closes its *b* contacts to make the circuit of relay R9 which, in turn, closes associated relay contacts 2 and 5 to separately complete the circuits of M2 and M5. The energization of M2 and M5 results in actuation of permanent magnets PM2 and PM5 to impress the item field at recording station with the combinational signal pattern of magnetic spots representing the keyed digit 9. Similarly, keying of other digits results in operation of combinational pairs of the permanent recording magnets to produce the magnetic signal patterns representting these digits. The *b* contacts of the keys in the A, K, U and Special zones (FIG. 11) connect to relays R0 to R9 similarly to the *b* contacts of the digit keys. In addition, the closure of the *a* contacts of any key in the A zone picks up M6 directly, so that the code patterns of the items in this zone will include the signal produced by impact of PM6 with the item field. In the K zone, all the key contacts *a* lead to M7, so that the encoding patterns in this zone will will include the signal produced by operation of magnet PM7. In the U zone, the key contacts *a* are common to the circuit of M8, whereby the encoding patterns in this zone will include the signal produced by operation of permanent magnet PM8. The key contacts *a* in the Special zone have their common side in circuit with a relay R11, the relay contacts of which lead separately to M7 and M8; hence, encoding patterns of this zone all include the signals produced by impact of the permanent magnets PM7 and PM8 with the item field.

The shift key operation can be made to control the encoding network for differentiating the encoding patterns of any number of upper and lower case items. In the present case, the code is extended by the shift key to distingush upper case items of the digit row from the lower case digit items. With shift key SK down, it is closing its key contacts *a*, bringing a relay R10 into circuit with the common side of the key contacts *a* in the digits row. The contacts of this relay separately pick up M6 and M7; hence the encoding patterns of the upper case items of the digits row will add the signals produced by permanent magnets PM6 and PM7 to the various digit signal combinations.

Provision is made for automatic recording of a monitor signal pattern at the end of each line of magnetic character patterns. In FIG. 11, element 25 represents a bypass pawl mounted by the common right hand margin stop carried by the conventional typewriter carriage rack. When the last item coding pattern has been recorded on a line, the carriage steps ahead and element 25 closes contacts 29, making the circuit of solenoid 11–MK. The solenoid closes contacts *a*, *b* and *c* to pick up M6, M8 and R6. The contacts of R6 pick up M2 and M4. Energized magnets M2, 4, 6 and 8 operate the permanent magnets PM2, 4, 6 and 8 to apply a monitor signal pattern to the line of magnetically encoded items. In known manner, solenoid 11–MK is also used to depress key MK (FIG. 1) which serves like the character keys to cause escape of the typewriter carriage, whereby the carriage now goes to the end-of-line position. In this position, element 25 (FIG. 11) closes contacts 33 to complete the circuit of a solenoid 11–CR which is the operating solenoid for carriage return key CR (FIG. 1). Operation of key CR causes carriage return and line spacing in known manner.

To erase any unwanted item coding pattern from an item field, the magnetic recording unit is first adjusted to its erase position (FIG. 1), setting the erase magnets E at the magnetic recording station in confrontation with an item field bearing the encoding pattern of the printed item at printing position. Thus, by bringing the printed form of the unwanted item to the printing position, the item field bearing the encoding pattern for the unwanted item is brought to the magnetic recording station in confrontation with the heads of the erase magnets now adjusted to this station. The erase key EK is now operated, closing erase key contacts EK*a* (FIG. 11) to establish the circuit of electromagnet EM. Hence the four erase magnets E (also see FIGS. 5 and 6) are depressed in unison to impact all the index positions of the item field at the recording station, canceling any unwanted item coding pattern therefrom.

Attention is called to the fact that the permanent magnets PM and E have their magnetic flux confined to their bipolar impact ends or heads. Each such head, in effect, is a U-form magnet constituted by coextensive pole pieces separated by an air gap and joined at the rear by the sectoin immediately above the bight of the air gap, as may be understood from the dotted polarity-indicating line in FIG. 10. It follows that the recording or erasing heads need not be integral terminal portions of the rods guided in blocks 62 (FIG. 5) but may be separated pieces of Alnico or other magnetizable material rigidly fixed to the lower ends of carrying rods of non-magnetic material.

While the invention has been shown and described in connection with a particular embodiment, it is to be understood that the invention may take form in other embodiments and that various changes may be made by those skilled in the art without departing from the principle of the invention. It is intended, therefore, to be limited only as indicated by the following claims.

What is claimed is:

1. A magnetic character encoding unit for a typewriter or the like having character types operable upon selection by character selecting means for printing characters one after another in character spaces along a line of a record sheet supported on a platen, said encoding unit comprising a single set of permanent, recording magnets corresponding in number and arrangement to the index positions of each of item fields presented one at a time at a recording station, offset from the printing position, concurrently with the presentation of a character space at the printing position, means mounting said permanent magnets for individual movement into magnetic recording impact with their respectively corresponding index positions in the item field at the recording station, means through which said character selecting means is effective encoding to select the magnets for actuation in any of various codal combinations corresponding to different characters, and means effective substantially concurrently with the printing of a selected character for actuating the selected, corresponding character coding combination of permanent magnets into magnetic recording impact with the item field at the recording station.

2. As in claim 1, the typewriter or the like having a housing, and means for mounting the magnetic character encoding unit externally on said housing with the permanent magnets in front of the platen and their record sheet impact ends oriented toward the item field at said recording station.

3. As in claim 1, said actuating means for the permanent magnets comprising electromagnets in the encoding unit, one electromagnet for each permanent magnet, and a character translating circuit network through which the electromagnets are selectively energized to drive the associated permanent magnets into recording impact with the item field at the recording station.

4. As in claim 1, said encoding unit also containing permanent magnet erasing means having a polarity reverse to the set of permanent recording magnets and having a record sheet impact area equal to the total impact area of the set of permanent recording magnets, means for alternatively locating either the set of permanent recording magnets or the permanent magnet erasing means into confrontation with an item field at the recording station, and means for actuating the permanent magnet erasing means into impact with a confronted item field to erase therefrom any character encoding magnetic signal pattern.

5. As in claim 4, the permanent magnet erasing means and the set of permanent recording magnets being mounted in fixed arrangement within the encoding unit, the typewriter or the like having an external part on which the encoding unit is mounted for adjustment between record and erase positions, respectively to locate the set of permanent recording magnets or the permanent magnet erasing means at said recording station.

6. As in claim 5, and means for releasably latching the encoding unit in either the record position or the erase position.

7. As in claim 6, a signal lamp circuit, and electric contacts operated by the encoding unit in the erase position for closing said lamp circuit.

8. As in claim 6, and means for returning the encoding unit to the record position upon release of the encoding unit between the record and erase positions.

9. As in claim 4, the set of permanent recording magnets and the permanent magnet erasing means being mounted alongside each other within the encoding unit, and means included in the typewriter or the like for mounting the encoding unit for adjustment parallel to the platen to locate either the set of permanent recording magnets or the permanent magnet erasing means at said recording station.

10. As in claim 1, wherein the record sheet is a magnetic record medium for receiving printing impacts from the types and magnetic signal impressing impacts from the permanent magnets, the typewriter or the like being provided with a paper guide around the platen formed with a strip confronting the permanent magnets throughout the range of magnetic recording in a line of item fields, the magnetic record medium being led over the strip to receive magnetic signal impressing impacts from the permanent magnets while a carbon copy sheet or sheets are led under the strip to be guarded thereby from receiving impressions from the permanent magnets.

References Cited by the Examiner

UNITED STATES PATENTS

| | | | |
|---|---|---|---|
| 2,333,463 | 11/1943 | Bryce | 346—74 |
| 2,337,553 | 12/1943 | Hofgoard | 346—74 |
| 2,784,392 | 3/1957 | Chaimowicz | 340—174.1 |
| 2,958,568 | 11/1960 | Hagelbarger | 346—74 |
| 2,962,339 | 11/1961 | Way Dong Woo et al. | 346—74 |
| 3,045,218 | 7/1962 | Brand | 340—174.1 |

IRVING L. SRAGOW, *Primary Examiner.*

M. K. KIRK, T. W. FEARS, *Assistant Examiners.*